United States Patent Office 3,830,736
Patented Aug. 20, 1974

3,830,736
WATER CLARIFICATION
Fritz MK Werdouschegg, St. Paul, Minn., assignor to General Mills Chemicals, Inc.
No Drawing. Filed Jan. 2, 1973, Ser. No. 320,409
Int. Cl. B01d 21/01
U.S. Cl. 210—53                                                  4 Claims

ABSTRACT OF THE DISCLOSURE

Method of clarifying water which contains organic substances either in dissolved or suspended form. The method is especially useful in water having a temperature below about 12° C. The method includes using anionic derivatives of galactomannans as flocculents.

This invention relates to the clarification of water. More particularly, this invention relates to the removal of organic materials from water using anionic derivatives of galactomannan gums.

Fresh water, such as from rivers, streams, lakes, ponds, reservoirs, wells and the like, generally contains decomposition products of plants either in the solid, colloidal, or dissolved form. Moreover, such waters can be contaminated with waste water of all types—sewage, effluents from processing plants such as pulp, paper and board mills, and the like. In addition they may pick up organic materials from the natural surroundings. The organic materials contained in these waters may, in some cases, by colored substances. The colored organic materials are not dyestuffs in themselves. In fresh, river, or waste water they are contaminants. In the clarification of fresh water, the objective is to remove solids, color and turbidity. In the clarification of effluent waters, that is actual waste water from processing plants, the objective is to remove color, turbidity, suspended solids and reduce the biological oxygen demand, to name a few.

The nature and reactivity of the organic material found in water varies widely. Furthermore, each type of organic material responds to particular methods of removal and not to others. The contamination make-up of the water in any specific instance is generally unknown. The particular treatment which is effective is therefore essentially determined experimentally. The first step in clarification of water is usually inducing coagulation of the contaminating material. Coagulation of the material can be initiated by adding a polyvalent cation to neutralize the zeta potential. The zeta potential is the electrical charge at the boundary between a particle and the suspending medium and relates to the repelling forces between equally charged particles. Once the zeta potential has been neutralized, a flocculating agent is added to facilitate the agglomeration of the coagulated material. Focculating agents which have been used are cationic, non-ionic and anionic polymers. Some suspended or dissolved material will respond to cationic polymers and not to anionic polymers. Other suspended or dissolved materials will respond to anionic polymers and not to cationic polymers. Non-ionic polymers are generally employed as bridging compounds to induce the formation of large agglomerated flocs.

Anionic copolymers of acrylamide and acrylic acid, cationic copolymers of acrylamides, and non-ionic polyacrylamides are commonly used as flocculents. In addition, galactomannan gums which are non-ionic natural polymers and quaternary derivatives of galactomannans which are cationic have been used for such purposes.

Among anionic polymers, the high molecular weight copolymers of acrylic acid and acrylamide and partially hydrolzyed polymers of acylamide have been the most popular of the anionic polymers which have demonstrated sufficiently strong flocculent properties to be commercially useful. The polyacrylamide-based anionic polymers and other anionic polymers used heretofore, however, have had one major disadvantage. While they will form floc at water temperatures below about 12° C. (55° F.), the floc's sedimentation rate is greatly inhibited at these temperatures. Experience has shown that increasing the amount of flocculating agent used does not improve the settling rate at the lower temperatures. This lack of settleability of the floc at temperatures below about 12° C. (55° F.) presents a good many problems in water treatment in cold climate areas as most water to be treated has a temperature range of about 0° C. (32° F.) to 10° C. (50° F.).

It has now been found that anionic derivatives of galactomannan gums form readily settable floc at water temperatures of from about 0° C. (32° F.) to 12° C. (55° F.) and are also equal in performance to presently used anionic polymers at higher water temperatures.

Anionic derivatives of galactomannan gums include the carboxyalkyl ethers of galactomannans and carboxyalkylated hydroxyalkyl ethers of galactomannans which may contain residual unreacted non-ionic substitution groups. The term "galactomannan" as used herein includes the general class of polysaccharides containing both galactose and mannose units. The galactomannans are usually found in the endosperm sections of leguminous seeds such as guar beans, locust beans, honey locust, flametree, tara beans and cassia occidentalis.

Carboxyalkyl ethers of galactomannan gums can be prepared using salts of halo fatty acids as disclosed in U.S. Pat. 2,520,161. These carboxyalkyl ethers of galactomannan gums when prepared by this method usually have an upper limit to the degree of substitution of around 0.5. By "degree of substitution" as used in the above disclosure is meant the average substitution of carboxyalkyl ether groups per anhydroso saccharide unit. The anhydrose saccharide unit of guar gum in the above disclosure was taken as two mannose and one galactose unit. The basic anhydrose saccharide units of locust bean gum comprise four mannose units and one galactose unit and of tara seven mannose units and four galactose units. The term "molar ratio" as used herein refers to the number of moles of the substituting reactant reacted with the anhydro saccharide unit. Substituting reactants such as alkylene oxide provide substitution sites in their configuration to which a halo fatty acid molecule or another alkylene oxide molecule may attach. Because the molar ratio is far easier to measure than the degree of substitution, the carboxyalkyl ethers and carboxylated hydroxyalkyl ethers of galactomannan used as flocculents in the present invention will be described in terms of molar ratio.

Carboxyalkyl ethers of galactomannan gums having higher degrees of substitution than 0.5 can be prepared by a procedure disclosed in United States Patent Application Ser. No. 8439, filed Feb. 3. 1970. The process disclosed therein is described below. All amounts are recited in parts by weight. One hundred parts of a galactomannan gum are mixed with an aqueous solution of an alkali metal hydroxide, preferably sodium hydroxide, which is added in an amount of 20 to 65, preferable 38 to 46, parts as a solution of up to 73% concentration. The addition of sodium hydroxide is done dropwise over a period of approximately 10 minutes. After the addition of the hydroxide, the mixture is mixed for 10 minutes at room temperature. Then 25 to 190, preferably 90 to 110, parts of a dry powder halo fatty acid or salt of a halo fatty acid is blended into the mix and heated for a period of time. The temperature and time are variable, such as at room temperature for 1 day but preferably 50° to 60° C. for 2–3 hours. If too much water is used, the product fuses to a viscous dough which cannot be easily handled. Upon completion of the reaction, organic acid may be added to adjust the final pH. The reacted product is dried until the moisture content is less than 15% and then ground to pass a 50 mesh screen. The specific degree of substitution is controlled by the amount of the reactants used. Suitable halo fatty acids include chloroacetic acid, chloropropionic acid and chlorobutyric acid or the salts of these acids. The halo fatty acids can have 2 to 4 carbon atoms in the fatty chain.

Carboxyalkylated hydroxyalkyl galactomannan gums are generally made by first reacting the galactomannan with an alkylene oxide and then reacting the resulting hydroxyalkyl galactomannan with a halo fatty acid reactant. The useful alkylene oxides are those having from 2–8 carbon atoms. Generally the oxirane group is a terminal vicinal epoxy group. Such alkylene oxides may be represented by the following formula:

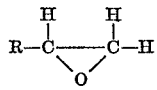

where R is a hydrogen group or an alkyl group having 1 to 6 carbon atoms. R is preferably methyl, such as in propylene oxide. R may also, however, be ethyl, propyl, butyl, amyl, hexyl and the like.

Basically the hydroxyalkyl ethers are prepared by reaction of the galactomannan gum with the alkylene oxide in the presence of an alkaline catalyst. Commercially available galactomannan gum generally contains from about 8 to 15% moisture by weight. For convenience, the hydroxyalkyl ether preparation will be described below with reference to galactomannan gum and propylene oxide to produce hydroxypropyl ether of galactomannan. The rate of reaction is dependent on the catalyst, propylene oxide concentration and the temperature. Temperature substantially higher than room temperature would generally require pressure equipment. Average reaction efficiency is in the range of 60–90%.

As indicated, the reaction of the alkylene oxide with the galactomannan gum may be conducted at room temperature or elevated temperatures. At room temperature, the reaction is relatively slow. A general temperature range would be from 17° C. to about 100° C. While higher temperatures might sometimes be used, such as up to 125° C., there is generally no advantage thereto and higher temperatures may have an adverse effect on the color of the final product. Where temperatures other than room temperatures are employed, temperatures on the order of 50–100° C. are generally used.

The reaction is carried out using alkaline catalysts. Such catalysts are in general alkaline metal or alkaline earth metal hydroxide such as sodium, potassium or calcium hydroxide. Ammonia may also be used. No special advantage, however, is obtained by the use of more exotic basic or alkaline catalysts over the use of sodium hydroxide which is the most commonly available alkaline catalyst. Only small amounts of catalysts need be employed. Thus it is generally not necessary to exceed 10% by weight of the galactomannan gum. The preferred range is 0.1 to 5% by weight of the galactomannan. The pressure used in preparing the hydroxyalkyl ether is not critical. Under the slowest conditions, times up to 100 hours may be required. Generally, at least one hour is required although under certain conditions shorter periods of time can be employed.

After completion of reaction of the galactomannan gum with the alkylene oxide the resulting hydroxyalkyl product may optionally be dried with or without washing and its pH adjusted with organic or mineral acids.

For the preparation of carboxyalkylated hydroxyalkyl galactomannan gums it is not necessary to proceed with the optional drying procedures described above. The reacted hydroxyalkyl galactomannan may be reacted directly with a halo fatty acid or a salt of a halo fatty acid reactant. Suitable halo fatty acids can have from 2 to 4 carbon atoms in the fatty chain. The said acids are preferably used in the form of alkali metal salts thereof. As such it is preferred to use the sodium salts. Sodium chloroacetate is the particularly preferred reactant. The reaction of the halo fatty acid reactant is carried out using the alkaline metal hydroxide as the reaction initiator already present from the previously completed reaction. The halo fatty acid reactant is used in an amount of 5 to 190 parts, preferably 90 to 110 parts, per 100 parts by weight of the galactomannan. The reaction temperature and time are variable, such as at room temperature for one day but preferably 50 to 60° C. for a few hours, i.e. 1 to 5.

In the water clarification method of the present invention a trivalent metal salt is first added to the water followed by an addition of an anionic derivative of galactomannan gum. Generally the trivalent metal salt and the anionic derivatives of the galactomannan gum are added in the form of dilute solutions. In the clarification process the water is subjected to some form of agitation to insure distribution of the clarifying additives.

Coagulation of the organic material in the water is initiated by the addition of the soluble trivalent metal salt. Aluminum salts are preferred, and most preferred are industrial alum or aluminum sulfate. Ferric salts, peferably chloride or sulfate, can be used when residual iron in the water is of no consequence. The concentration of trivalent metal ions required to coagulate the organic materials depends upon pH, conductivity and zeta potential of the water. Once the zeta potential is neutralized, the organic material coagulates. Depending upon the above factors, the concentration of the trivalent metal ion sufficient to achieve coagulation may be from as low as 1 part per million by weight to an amount exceeding 1000 parts per million by weight. In most instances a concentration of about 20 to 50 parts per million by weight of the trivalent metal salt is sufficient to initiate coagulation. When only the trivalent metal salt is used in the clarification process, the floc is usually feebly formed and demonstrates little tendency to settle. A typical floc of this type is illustrated in Example I. As can readily be appreciated, this type of floc is not acceptable or commercially useful for water clarification.

Once the trivalent metal ion neutralizes the zeta potential of the aqueous system, the anionic derivatives of the galactomannan gums interact with the neutralized organic material to form larger agglomerates which are readily removable. The anionic derivatives of galactomannan gum can be used in concentrations of from about 0.25 to 100 parts per million by weight. From about 0.25 to 50 parts per million by weight is preferred for fresh water and from about 1 to 100 parts per million by weight in effluent water. In effluent water 1 to 15 parts per million by weight is more preferred and most preferred is 0.5 to 5 parts per million by weight. The range of degrees of substitution in the carboxyalkyl ethers of galactomannans is about 0.02 to 2.0. The molar ratio is generally about 0.2 to 2. The range of degrees of substitution in the carboxylated hydroxyalkyl ethers of galactomannans can be a total of about 0.2 to 2.0 for the carboxyalkyl and hydroxyalkyl groups. The molar ratio in all cases can be about 0.2 to 2.

The preferred floc is sufficiently dense, cohesive and compact so that it may be rapidly removed by settling, flotation, filtration or centrifuging. Also highly desirable is the settleability of the floc at low water temperatures, i.e. about 0° C. to 12° C. This property has heretofore been lacking in the art of water clarification by flocculation. The rapid formation of floc, the cohesive character of the floc and the low temperature settleability of the floc produced by anionic derivatives of galactomannan gum is illustrated in Examples II and III. Also shown is a commercially representative flocculation treatment using a commercial anionic polyacrylamide flocculent. As can readily be seen, the floc produced by the anionic derivatives of galactomannan gum settled more rapidly at low water temperatures than the flocs of the anionic polyacrylamide.

EXAMPLE I

This example illustrates the effect of adding various anionic carboxyalkyl ethers of galactomannans as flocculent agents to the water samples taken from a city water treatment plant. The temperature of the water was 9° C. and the pH 6.3. The following polymers representative of the present invention were used:

Polymer A—carboxymethylhydroxypropyl ether of galactomannan polysaccharide (from guar endosperm) having a 0.25 carboxymethyl molar ratio of substitution and 0.5 hydroxypropyl molar ratio of substitution.

Polymer B—carboxyethyl ether of galactomannan polysaccharide (from guar endosperm) having a 0.75 molar ratio of substitution.

from the samples the period of time in seconds required for the floc to settle was noted. At the end of the 20 minute quiescent period the supernatant liquid was sucked into separate containers for color evaluation. The color evaluation was made using the American Public Health Association Method C1-64T. This method involves visually comparing water samples to APHA platinum cobalt color standards and recording comparable cobalt-platinum concentrations in p.p.m. The results are shown in Table 1.

TABLE 1

| Polymer sample | Control | | A | | |
|---|---|---|---|---|---|
| Alum, p.p.m | 20 | 150 | None | 20 | 20 |
| Polymer, p.p.m | | | 1.4 | 1.0 | 1.4 |
| Size of formed floc in mm. after— | | | | | |
| 1 minute mixing at 100 r.p.m | None | Pin floc | Pin floc | 0.4–0.6 | Pin floc |
| 3 minutes mixing at 50 r.p.m | Pin floc | 0.4–0.8 | do | 0.4–1.4 | 0.4–0.8 |
| 5 minutes mixing at 20 r.p.m | 0.2–0.6 | 0.4–1.4 | do | 0.4–3.0 | 0.4–3.0 |
| Rate of settling in seconds during quiescent period | >360 | >360 | None | Most in 100 | Most in 90 |
| APHA color, p.p.m | <10 | <10 | Not noted | Not noted | Not noted |
| Settled floc appearance | Not noted | Not noted | do | do | Very coarse clumps |

| Polymer sample | B | | | C | | |
|---|---|---|---|---|---|---|
| Alum, p.p.m | 10 | 20 | 20 | 10 | 20 | 20 |
| Polymer, p.p.m | 0.357 | 1.43 | 3.57 | 0.5 | 2.0 | 5.0 |
| Size of formed floc in mm. after— | | | | | | |
| 1 minute mixing at 100 r.p.m | None | Pin floc | Pin floc | None | Pin floc | Pin floc |
| 3 minutes mixing at 50 r.p.m | do | 0.2–0.4 | 0.2–0.4 | do | 0.2–0.4 | 0.2–0.4 |
| 5 minutes mixing at 20 r.p.m | 0.2–0.4 | 0.4–0.8 | 0.4–0.6 | Pin floc | 0.4–0.8 | 0.4–0.6 |
| Rate of settling in seconds during quiescent period | None | >360 | >360 | None | >360 | >360 |
| APHA color, p.p.m | <10 | Not noted | Not noted | <10 | Not noted | Not noted |
| Settled floc appearance | None | Coarse and loose | Medium and loose | Not noted | Coarse and loose | Medium and coarse |

Polymer C—carboxymethyl ether of galactomannan polysaccharide (from guar endosperm) having a 0.2 molar ratio of substitution.

The testing procedure was as follows:

Six 1000 milliliter samples of water were thoroughly stirred using a multiple laboratory mixer operated at 100 r.p.m. to insure uniform distribution of the suspended solids. Alum in amounts to produce the concentrations shown in Table 1 was added to and distributed in each sample. The flocculating agents were added 30 seconds after the alum addition. The immediate floc formation was noted. Mixing of the water samples was continued for one minute at 100 r.p.m. Mixing was then continued for three minutes at 50 r.p.m. and then for a five minute period at 20 r.p.m. During mixing at 50 r.p.m. and at 20 r.p.m. the size of the floc particles was visually estimated in millimeters. At the end of the 20 r.p.m. mixing period the mixer blades were lifted out of the water samples. The samples were then allowed to stand for a timed period of twenty minutes. At the point that the mixer blades were lifted The effect of alum alone in comparable water samples is shown in Table 2. The testing procedure was the same as described above with the exception that the flocculating agents were not added.

TABLE 2

| Sample No | 1 | 2 | 3 | 4 | 5 | 6 |
|---|---|---|---|---|---|---|
| Alum, p.p.m | 0 | 5 | 10 | 20 | 40 | 80 |
| Size of formed floc after— | | | | | | |
| 1 minute mixing at 100 r.p.m | None | None | None | None | None | None |
| 3 minutes mixing at 50 r.p.m | do | do | do | Pin floc | Pin floc | 0.2–0.4 |
| 5 minutes mixing at 20 r.p.m | Pin floc | Pin floc | Pin floc | 0.4–0.8 | 0.4–0.8 | 0.4–0.8 |
| Rate of settling in seconds during quiescent period | None | None | None | <360 | <360 | <360 |
| APHA color, p.p.m | <10 | <10 | <10 | <10 | <10 | <10 |
| Settled floc appearance | None present | Fine and slimy | Fine and slimy | Coarse and loose | Coarse and loose | Medium and slimy |

As can readily be seen, alum alone, while it is a coagulating agent, is a poor flocculating agent. It can also be seen that the best apparent result with the above water was obtained using about 20 p.p.m. alum.

EXAMPLE II

This example illustrates the difference between the anionic derivatives of galactomannan gum as flocculents and the well-known anionic polyacrylamide. The water source was a stream supplying a papermill. The test method was the same as set out in Example I with the exception of the time period at which the mixture was mixed during floc formation. Note should be taken that amounts of the flocculents used was based upon the cost of the materials. As can readily be seen the cost of the polyacrylamide was about twice the cost of the anionic galactomannan. Table 3 shows the results obtained at a water temperature of 24° C., Table 4 at water temperature of 6.5° C. and Table 5 at water temperature of 5° C. The anionic polyacrylamide was a commercially avaliable product with about 5 million molecular weight and an acrylamide-acrylic acid ratio of 9:1. About 60 percent of the carboxylic groups were ionized.

TABLE 3

|  | Polyacrylamide | | Polymer C | |
|---|---|---|---|---|
| Alum, p.p.m. | 70 | 140 | 70 | 140. |
| Polymer, p.p.m. | 0.5 | 0.5 | 1.14 | 1.14. |
| Immediate floc formation | Pin flock | Pin floc | Floc in 2 minutes | Floc in 10 seconds. |
| Floc after mixing: | | | | |
| 3 minutes at 100 r.p.m. | Poor | Good | Good | Excellent. |
| 10 minutes at 20 r.p.m. | Fair | do | Very good | Do. |
| Settling rate in seconds | 150″ | 140″ | 70″ | 50″. |
| pH | 6.83 | 6.21 | 6.80 | 6.26. |
| APHA color, p.p.m. | 60 | 11 | 64 | 12. |

TABLE 4

|  | Polyacrylamide | | | Polymer C | | |
|---|---|---|---|---|---|---|
| Alum, p.p.m. | 70 | 100 | 140 | 70 | 100 | 140. |
| Polymer, p.p.m. | 0.5 | 0.5 | 0.5 | 1.14 | 1.14 | 1.00. |
| Immediate floc formation | Poor | Fair | Poor | Good | Good | Excellent. |
| Condition of floc after mixing: | | | | | | |
| 3 minutes at 100 r.p.m. | Fair | Good | Fair | do | do | Do. |
| 10 minutes at 20 r.p.m. | do | do | do | Very good | Very good | Very good. |
| Settling rate in seconds | >300″ | Most in 150″ | Most in 190″ | 30′ | 20″ | 60″. |
| APHA color, p.p.m. | 66 | 25 | 14 | 40 | 37 | 16. |
| pH | 6.92 | 6.62 | 6.22 | 6.8 | 6.7 | 6.5 |
| Settled floc size, mm | <1 | 2 | 1-2 | 5 | 5 | 5. |

TABLE 5

|  | Polyacrylamide | | Polymer B | | Polymer C | |
|---|---|---|---|---|---|---|
| Alum, p.p.m. | 50 | 65 | 50 | 65 | 50 | 65. |
| Polymer, p.p.m. | 0.5 | 0.5 | 0.87 | 0.87 | 1.1 | 1.1. |
| Immediate floc formation | Slow | Slow | Fast | Fast | Fair | Fair. |
| Size of formed floc in mm. after mixing: | | | | | | |
| 2 minutes at 100 r.p.m. | 0.5-0.8 | 0.5-1.0 | 1.0-2.0 | 2.0-4.0 | 0.5-1.0 | 1.0-2.0. |
| 10 minutes at 20 r.p.m. | 1.0-2.0 | 1.5-2.5 | 3.0-6.0 | 3.0-6.0 | 2.0-4.0 | 2.0-5.0. |
| Settling rate in seconds | Very slow | Very slow | Fair | Fair | Fair | Fair. |
| Apparent color | Amber | Colorless | Amber | Colorless | Amber | Colorless. |
| Floc appearance | Fine | Fine | Very coarse | Very coarse | Coarse | Coarse. |

As can readily be seen from the above data, alum alone did not produce an acceptable floc. The anionic derivative of galactomannan gum alone did not produce a floc. The combination of alum treatment and anionic derivatives of galactomannan gum did produce a readily settleable floc at cold water temperatures. At cold water temperatures the anionic derivatives of galactomannan gum were superior to known anionic polyacrylamides for application in commercial water treatment facilities.

The embodiments of the invention in which an exclusive property or privilege is claimed are defined as follows:

1. A method of clarifying water containing organic material, which comprises dispersing a soluble trivalent metal salt in the water thereby neutralizing the zeta potential in the system and initiating coagulation of dissolved, colloidal or suspended organic materials in the water and subsequently dispersing an anionic derivative of galactomannan gum in the water thereby flocculating the coagulated material, wherein the anionic derivative of galactomannan gum is selected from carboxyalkyl ether of galactomannans, wherein the carboxyalkyl groups contain 2 to 4 carbon atoms, and carboxyalkylated hydroxyalkyl ether of galactomannans wherein the carboxyalkyl groups cantain 2 to 4 carbon atoms and the hydroxyalkyl groups contain 2 to 8 carbon atoms.

2. The method of claim 1 wherein the water temperature is between about 0° C. and 12° C.

3. The method of claim 1 wherein the anionic derivative of galactomannan gum is used in amounts of from about 0.25 to 100 parts per million.

4. A method of clarifying water having a temperature below about 12° C. and containing organic material, which comprises dissolving and dispersing a soluble trivalent metal salt selected from salts of aluminum or ferric ions in amounts sufficient to initiate coagulation of dissolved, colloidal or suspended organic materials present in the water;

dispersing in the soluble trivalent metal salt and water solution an anionic derivative of galactomannan gum selected from carboxyalkyl ether of galactomannan gums, wherein the carboxyalkyl groups contain from 2 to 4 carbon atoms, and carboxyalkylated hydroxyalkyl ether of galactomannan gums wherein the carboxalkyl groups contain from 2 to 4 carbon atoms and the hydroxyalkyl groups contain from 2 to 8 carbon atoms, said anionic derivative of galactomannan gum being at a concentration of about 0.25 to 100 parts per million by weight of the water.

References Cited

UNITED STATES PATENTS 3,082,173   3/1963   Horvitz _____ 210—54
2,520,161   8/1950   Moe _____ 260—209 R CHARLES N. HART, Primary Examiner P. A. HRUSKOCI, Assitant Examiner U.S. Cl. X.R.

260—209 R

PO-1050
(5/69)

UNITED STATES PATENT OFFICE
CERTIFICATE OF CORRECTION

Patent No. 3,830,736      Dated August 20, 1974

Inventor(s) Fritz MK Werdouschegg

It is certified that error appears in the above-identified patent and that said Letters Patent are hereby corrected as shown below:

Col. 1, line 31, "by" should read - be -

Col. 1, line 54, "Focculating" should read - Flocculating -

Col. 2, line 59, "preferable" should read - preferably -

Table 2, line 47, In columns 4, 5, and 6 "<360" should read - >360 -

Signed and sealed this 17th day of December 1974.

(SEAL)
Attest:

McCOY M. GIBSON JR.
Attesting Officer

C. MARSHALL DANN
Commissioner of Patents